(12) United States Patent
Shreider et al.

(10) Patent No.: US 8,334,611 B2
(45) Date of Patent: Dec. 18, 2012

(54) APPARATUS FOR RECEIVING AND TRANSFERRING KINETIC ENERGY FROM WATER WAVES

(76) Inventors: Vladimir Anatol Shreider, Sydney (AU); Natalia Shreider, Sydney (AU)

( * ) Notice: Subject to any disclaimer, the term of this patent is extended or adjusted under 35 U.S.C. 154(b) by 400 days.

(21) Appl. No.: 12/803,436

(22) Filed: Jun. 28, 2010

(65) Prior Publication Data

US 2010/0308583 A1    Dec. 9, 2010

Related U.S. Application Data

(63) Continuation-in-part of application No. 12/001,943, filed on Dec. 14, 2007, now Pat. No. 7,928,594.

(51) Int. Cl.
*F03B 13/10* (2006.01)
*F03B 13/12* (2006.01)
*H02P 9/04* (2006.01)

(52) U.S. Cl. ............................................. 290/53; 290/42
(58) Field of Classification Search ............... 290/42, 290/53
See application file for complete search history.

(56) References Cited

U.S. PATENT DOCUMENTS

| | | | |
|---|---|---|---|
| 7,928,594 B2* | 4/2011 | Shreider et al. | 290/54 |
| 2009/0152870 A1* | 6/2009 | Shreider et al. | 290/53 |
| 2010/0221106 A1* | 9/2010 | Shreider et al. | 415/203 |
| 2010/0230964 A1* | 9/2010 | Sachs | 290/42 |
| 2011/0089689 A1* | 4/2011 | Gregory | 290/42 |

* cited by examiner

*Primary Examiner* — Pedro J Cuevas

(57) ABSTRACT

A floatable surface vessel comprises a vessel hull having a circular sector-shaped cross-section and a ballast filling with a controllable position of a centre of mass disposed remote from the circular centre and adapted to come into resonance with rocking action of water waves being induced a rocking motion of the hull about the circular centre and a frame being supported on the hull for rotation about the circular centre to be isolated from the rocking.

9 Claims, 2 Drawing Sheets

US 8,334,611 B2

APPARATUS FOR RECEIVING AND TRANSFERRING KINETIC ENERGY FROM WATER WAVES

CROSS-REFERENCE TO RELATED APPLICATIONS

This application is a continued-in-part Application/Control Ser. No. 12/001,943, Art Unit 2839, filed Dec. 14, 2007 now U.S. Pat. No. 7,928,594 and non-elected and withdrawn from consideration pursuant to 37CFR 1 142(b).

STATEMENT REGARDING FEDERAL SPONSORED R and D

Not Applicable

REFERENCE TO A MICROFICHE APPENDIX

Not applicable

BACKGROUND OF THE INVENTION

The invention relates to apparatuses for receiving and transferring kinetic energy of a fluid basin, especially a water basin into any usable power and to surface vessels as defined in claim 1 for receiving and transferring an energy of the water waves and for damping a waves induced rocking and rolling motion of the vessels.

There exists a need for effective units which do not require substantial vehicular support for deployment or retrieval and can be placed in a particular optimal operative position in the water basin, then easily maneuvered to a different position within the basin in the event of a change of location of the optimal path of the waves and stabilised in the path without complex anchoring means.

For claim 1 there is well-known that the surface vessel produces the most powerful natural waves induced rocking or pitching or rolling motion which contains huge kinetic energy. For conversion of the energy of the rocking motion into any useful power it is needed a supporting mechanical component such as a sea bottom but which may be remote and therefore must be substituted. Here are considered as the nearest:

a known from U.S. Pat. No. 6,561,856 of May 13, 2003 waves-powered ship propulsion system comprising a gyroscopically stabilised platform carried by a ship and isolated from a pitching motion of the ship; the disadvantages of this technology are relative short distance of a moment of force and therefore needing a large size gyroscope, and to control a gyro-precession;

and following systems servicing for damping a rocking motion of ships that is important for the safety, comfort and efficiency of loading and unloading of a cargo of the ships:

forward and astern located, rocking-suppressing stabilisers known from U.S. Pat. No. 4,266,496 issued May 12, 1981 that are carried beneath the vessel and have horizontal surface areas disposed tangentially in relation to an axis of rocking. The disadvantage is that the stabilisers are not capable of stabilising a rolling motion of the ship.

The invention is intended to eliminate the prior art inconveniences and is directed to new and useful developments and alternatives to the prior art.

SUMMARY OF THE INVENTION

An embodiment of the apparatus according to the invention provides a water waves kinetic energy-receiving and transferring system for transforming and damping and restraint a waves induced rocking motion of a surface vessel. The general idea of the claimed invention is utilisation of the rocking process through interacting with a stabilised frame which being isolated from the motion and motionless owing to being supported from a vessel hull for a rotation about a centre which being matched with a determined centre of the motion and further stabilised by means of its gravity and adjacent motionless water.

The hull comprises: a number of facilities for containing a ballast sand of an intended constant mass and a ballast water, the ballast water is capable of be spread within a volume of the sand and changed in its mass and a position of a centre of mass of the ballasted hull; an energised bilge pumping equipment for effecting a change of the mass and the position of the centre, and a means for measuring frequencies of the rocking, pitching and rolling motions of the ballasted vessel and determining when to operate an activating means of the equipment to effect tuning of the ballasted hull into resonance of the motions to effect increasing of the induced generation of the intended energy and into a dissonance of the motions to effect increasing of the restraint of the motions.

The hull adapted to generate the energy that comprises boards and a bottom having a circular about the centre outer surface. The vessel comprises a frictionless bearing means supporting the frame means remote from the centre. The hull has a upward oriented circular, in relation to the centre, surface area, the frame means has a downward oriented, co-centred surface area, and the bearing means comprises a movable co-centred bearing retainer member extending between the surfaces, and a plurality of bearing balls connected movably to the retainer member.

The stabilised frame means is adapted to extend down toward below a water line of the hull and has a vertical surface area with its centre of dynamic pressure upon adjacent water that located remote from the centre.

The system comprises a number of first rocking motion-restraint and energy-transferring members, each of the first members is supported at its end from the stabilised frame means in a depending relationship and remote from the centre;

a number of second rocking motion-restraint and energy-transferring members, each of the second members is supported at its end from the hull remote from the centre and capable of being forced into interaction with a corresponding first member, where the rocking, pitching and rolling motion of the vessel produces a relative movement between the supported ends of the interacting first member and second member, which movement causes a relative movement between the interacting first member and second member to produce an amplified oscillating motion of the second member to provide intended restraint of the rocking motion about the centre and generation of the energy.

Each of the number of the first members is supported for rotation about a first point, and each of the second number of the second members is supported for rotation about a second point, the first point and the second point being remote from the centre. The system comprises a number of reversible machines, each of the machines is connected to the first member and to the second member therebetween and capable of generating an intended usable energy and restraint the relative movement between the ends of the first and second members. The machine is a cylinder and sliding vane motor-pump assembly comprising a circular cylindrical shaft member having first and second opposing end pin portions and at least one pumping and damping vane portion extending radially, in relation to an axis of the shaft member, between the first and second pin portions, where each of the vane portions has a first end and a second end and an outer edge extending between the first and second edges toward immediately an inner face of a pumping and damping cylinder member of the assembly, the co-axially disposed pumping and damping cylinder member having two opposing, radially extending end walls that being provided with axial openings generally surrounding the pin portions of the shaft member and a circular cylindrical wall extending between the end walls and having vane portions extending between end walls radially inward and toward immediately an outer face of the shaft member, a sealing means at the openings and edges of the vane portions of the shaft and cylinder members for engaging on the faces of the cylinder and shaft members to relatively close off interiors between the vane portions of the cylinder and shaft members and prevent the outflow of the fluid materials being compressed from the interiors being reduced into the adjacent interiors being extended; a valves and pipes for sucking the fluid materials into the interior being extended and exhausting the compressed fluid materials from the interior being reduced toward a reserve tank receiving and storing the compressed fluid materials, where the valves are capable of tuning the generating-pumping system or shutting it down; the tank provided with valves and pipes for transferring the compressed fluid materials toward an user, where the valves are capable of changing pressure of the stored fluid materials for tuning the generating-pumping system or shutting it down.

The invention may be understood more readily and various other features of the invention may become more apparent from consideration of the following description.

DESCRIPTION OF THE PREFERRED EMBODIMENTS

Figure 2:
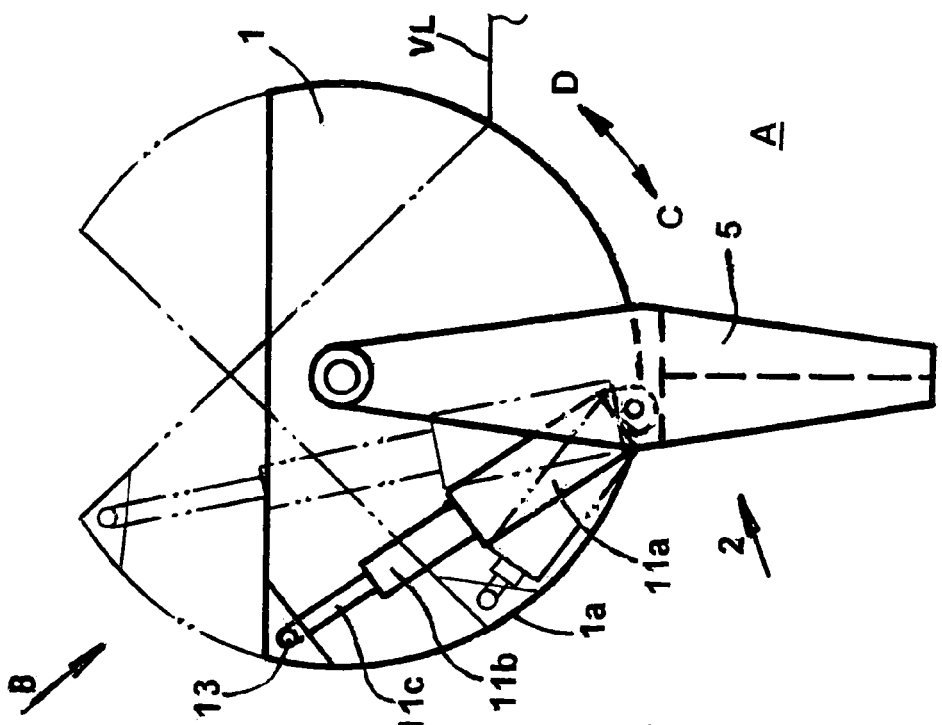
FIG. 2 is a side view of the vessel shown in FIG. 1.
Figure 1:
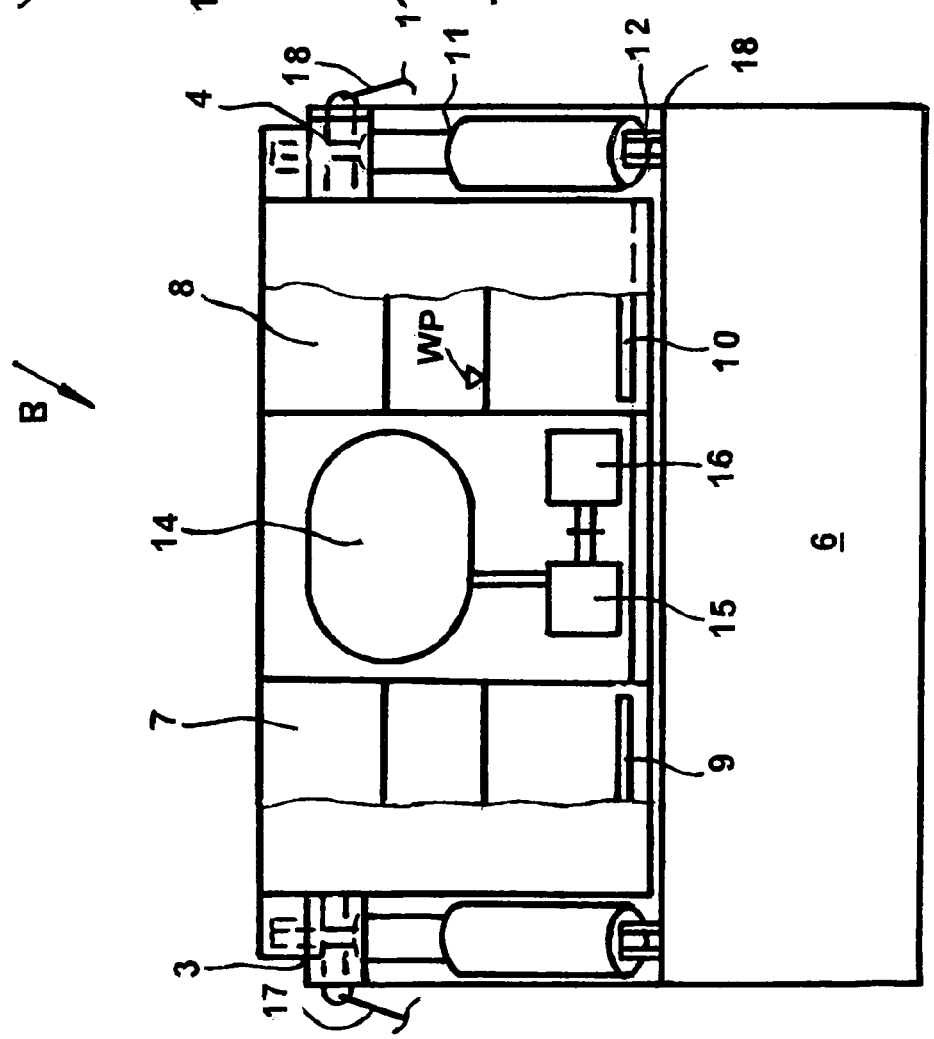
FIG. 1 is a front view of a first embodiment of a kinetic waves induced energy-receiving and transferring vessel of the apparatus according to the invention.

A float-able on surface of a water basin A such an ocean or a sea or a great lake, barge or ship or vessel and the like preferable embodiment B of an apparatus according to the invention for receiving kinetic energy of surface water waves and transforming this energy into useable energy, the embodiment B comprises as shown on FIGS. 1 and 2 a vessel hull 1 capable of facing waves of the basin A and moving like rocking, pitching and rolling about a determined central point of the rocking motion, for example, the circular cylindrical hull 1 capable of rolling about its generally horizontal, central longitudinal axis, the rolling axis being on a vertical, central longitudinal plane of the hull 1 and transversal to a direction of advancement of the waves. The dashed lines on FIG. 2 indicate ultimate permissible operative positions of the hull 1 while it is rolling when heavy weather loads exist.

In a first embodiment, an U-shaped, submersible stabilizer frame 2 is rotatably about the axis affixed at its upper ends with a co-axial bearing means such as axles 3 and 4 and a clearance on side ends of the hull 1. Only one common axle could of course be utilized, depending on the design of the vessel B. The frame 2 has axially and radially downward extending opposite rib or shelf members 5 and a paddle-shaped member 6 extending between the members 3 and below the water line shown as VL in FIG. 2 and preferably a bottom 1a of the hull 1 and having radially intending surface areas for pressing up onto motionless adjacent water of the basin A in opposite directions shown by arrows C and D in FIG. 2 and remote from the axis. The shape of the frame 2 in vertical projection, i.e. its contour, can be adapted to the pertinent conditions for the vessel B in question, and will preferably have a rectangular shape and a depth of its immersion can be adapted to follow the bottom 1a, such that the depth of immersing is acceptable, and its intended radial width can be selected according to a total mass of the hull 1 and is determined by trials. More than two members 5 and one member 6 could of course be utilized, depending on the requirements. Better stabilization of the frame 2 can be obtained as the members 5 and 6 are arranged such that they extend out beyond a determined wave zone.

Advantageously, the hull 1 can be provided with controllable ballast media. The ballast media can be contained in a number of facilities, for example, opposite holds 7 and 8 for containing a ballast sand of an intended constant mass and a ballast water which being spread within a volume of the ballast sand and capable of being changed in the mass, preferably from the basin A. A well-known energized bilge pumping equipment (not shown) is provided, preferably on the vessel B for effecting a change of the mass of the ballast water, that having injection and drainage pipes 9 and 10 for feeding an intended mass of the water into the ballast sand which being in the holds 7 and 8 and for removing an intended mass of the ballast water out of the holds 7 and 8. Each hold 7 and 8 can be provided with a well-known device (not shown) for measuring a position of a controllable ballast water plane indicated on the drawing by a line WP. The vessel B is provided with a well-known means for measuring a frequency of the rolling motion of the ballasted hull 1 and determining when to operate an activating means of the bilge pumping equipment to effect tuning of the rocking system into resonance of the waves induced motion to increase the intended generation of the energy or into a dissonance of the motion to increase the intended damping or restraint of the unwanted motion. Only one or more than two ballast holds could of course be utilized, depending on the requirements.

In operation, the injection and drainage ballast pump means is capable of injecting water A into the ballast sand which being in the holds 7 and 8 to increase the mass of the hull 1 or draining the watered sand to decrease a mass of the ballast and a mass of the ballasted hull 1 and to displace the gravity center of the hull 1 in relation to the axis from its position into an intended position which corresponding to the intended pendulum characteristics of the rolling hull 1. Whereby operating the pump means moves the ballast water in relation to the sand in the holds 7 and 8 in the intended sense, which movement of the water changes correspondingly the mass and the frequency of the own pendulum oscillation of the hull 1 about the axis into the resonance with the rolling oscillation which being forced by the waves, thereby the amplitude of the rolling motion of the hull 1 is increased up to maximal permissible amplitude and the receiving kinetic power will achieve its maximum.

A known means for transferring kinetic energy of the rocking hull 1 into an usable energy such as potential energy of compressed air and electricity can be used on the vessel B. Each of a number, four preferably, of double-acting, pistons and cylinders brake-pump units 11 has its disposed telescopically cylinders 11a and 11b pivotally secured via a linkage or bracket pivot connection 12 at a lower end to the frame 2 and by its piston rod 11c pivotally connected via a linkage or a bracket pivot connection 13 to the hull 1 and is capable of compressing air or air and water, preferably water A into a pressure tank 14 through input pipes and well-known controlling one way check valves (not shown) to ends of interiors of the cylinders 11a and 11b and by an output pipe and a well-known controlling relief valve (not shown) to a well-known hydro-turbine 15, which has an output shaft and is combined with an electricity generator 16 having a generator stator fixed on the hull 1 and a generator rotor having an input shaft coupled via a well-known speed increaser such as a gear box (not shown) to the turbine shaft.

Each of the members 6 has tangentially oriented, in relation to the axis, hull 1 rolling motion-damping face portions capable of forcing the motionless water A in the directions C and D for being also motionless and capable of supporting the cylinder 11a against piston cylinder 11b while the piston rod 11c is capable of being displaced in relation to the cylinders 11a and 11b with the hull 1 when it being rolled. The face portions of the member 6 are operable by the waves and pressure of the fluid in the cylinders 11a and 11b to damp out movement of the piston rod 11c because rolling motion of the hull 1 to effect damping and restraint of the rolling motion.

The vessel B is provided with at least two elongate tethers 17 and 18 such as lengths of anchor chains, each of the chains having an upper chain end which being attached to a side end of the frame 2 and a lower chain end which being attached to an anchor capable of engaging to a water basin bottom or a sea platform (not shown).

For the purpose of description of the operation of the vessel B, it will be assumed, that the hull 1 is placed on the waving surface of the rough water basin A and the paddle member 6 is submerged in the water basin A to operate. The hull 1 is being rolled by means of the waves alternately in the leftward and rightward lateral directions C and D about the rolling axis. Whereby the hull driven end of the piston rod 11c moves with the hull 1 about the rolling axis and the frame stopped end of the cylinder 11a remains motionless, a relative movement being produced between the supported end 12 of the cylinder 11a and the supported end 13 of the piston rod 11c. This relative movement causes a relative movement between the rod 91c and the cylinders 11b and 11a to produce an amplified oscillating motion of the rod 11c in relation to the piston cylinder 11b and a relative oscillating motion between the piston cylinder 11b and the cylinder 11a. Thereby air or air and water of the basin A will be alternately sucked into and compressed in the cylinders 11a and 11b and displaced from the cylinders 11a and 11b through the pressure pipes and valves into the tank 14 for accumulating and storing potential energy of the compressed air. Then the compressed fluid, preferably water can be fed from the tank 14 through the pressure pipe and the controlling relief valve into the turbine 15 to rotate the turbine rotor and a generator rotor in relation to a generator stator of the generator 16 and electricity energy will generate.

Figure 4:
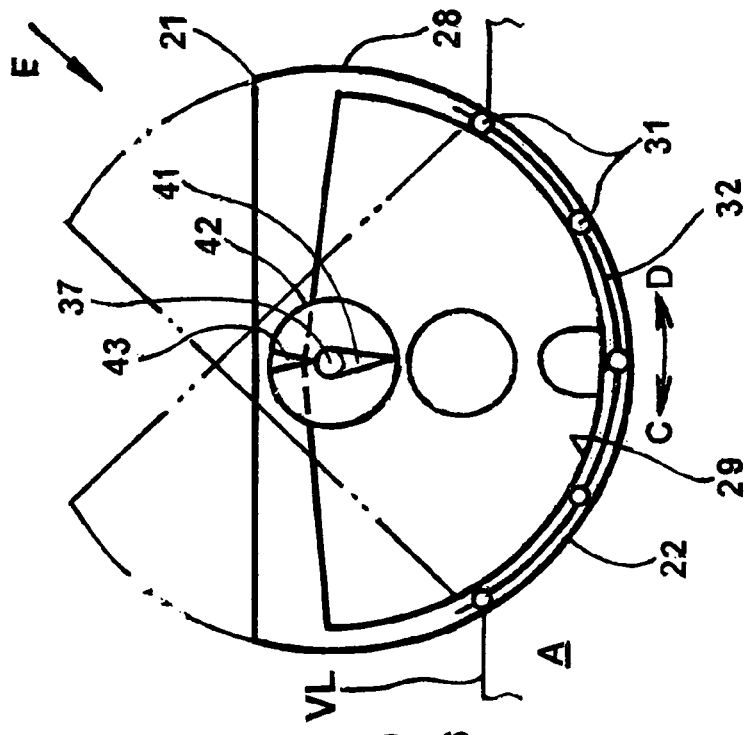
FIG. 4 is a part-section side view of the vessel shown in FIG. 3.
Figure 3:
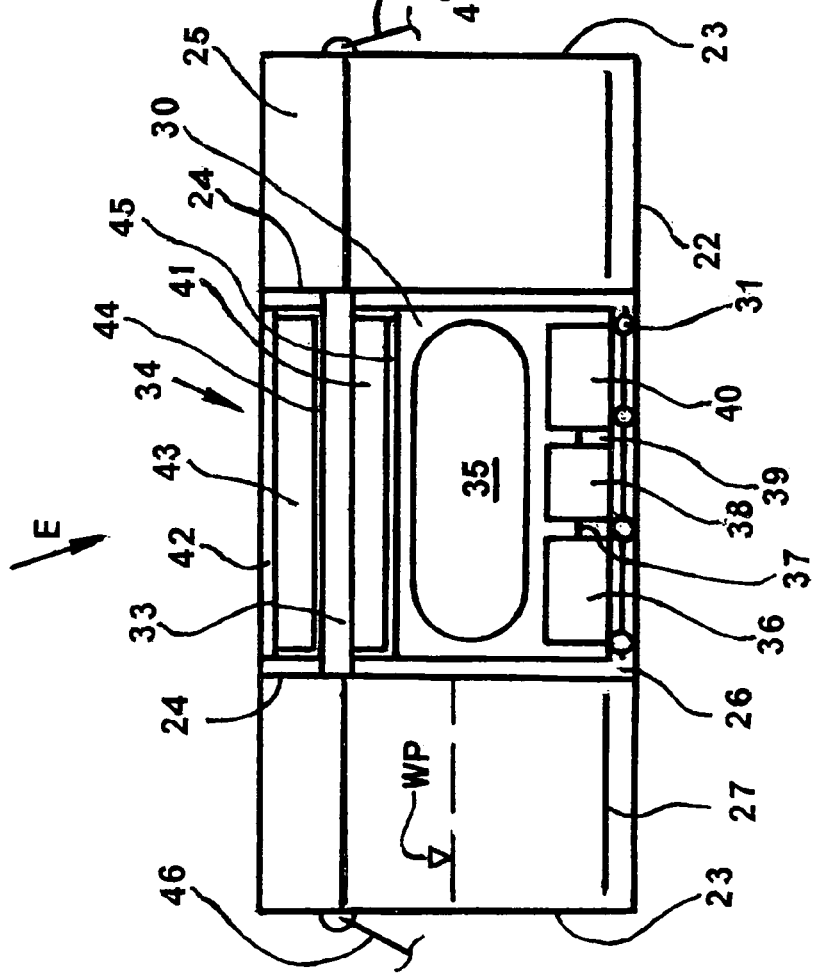
FIG. 3 is a longitudinal vertical section view of a second embodiment of a kinetic waves induced energy-receiving and transferring vessel according to the invention.

A second preferable embodiment of an apparatus according to the invention for restraint a rocking, pitching and rolling motion or for receiving kinetic energy of surface water waves and transforming this energy into any useable energy, the second embodiment comprises a floatable on surface of the water basin A barge or ship or vessel E as shown on FIGS. 3 and 4 that having a vessel hull capable of facing the surface waves of the basin A and rocking about its rocking centre and, for example, a circular cylindrical vessel hull 21 capable of especially rolling about a determined, generally horizontal axis, the axis being preferably on a central vertical plane of the hull 21 and crossing a direction of advancement of the waves. The dashed lines on FIG. 4 indicate ultimate permissible operative positions of the hull 21 while it is rolling when there is a heavy load of the waves.

The hull 21 has a circular cylindrical bottom and side boards 22, end walls 23 and inner walls 24 which form opposite end holds 25 and a middle hold 26. More than one middle hold 26 or more than two holds 25 could of course be utilized, depending on the requirements. Advantageously, the holds 25 can be provided with any controllable ballast media. The ballast media includes preferably an intended constant mass of a ballast material having a plurality of through pores of intended sizes, such as sand and an intended controllable liquid ballast mass such as water, preferably water from the basin A, which can be spread within the ballast sand. A well-known energized bilge pumping equipment (not shown) is provided on the vessel E that having injection and drainage pipes 27 for feeding the intended mass of the ballast water into the ballast sand which being in the holds 25 and for removing intended masses of the ballast water out of the holds 25. The vessel E has a well-known means such as a tank-level gauge for measuring the mass of the ballast water having a level shown as WP in FIG. 3 and a stop-watch (not shown) for measuring a frequency of its rocking motion and determining when to operate an activating means of the bilge pumping equipment as shown at 27 to effect further changing of an amplitude of the rocking motion toward resonance with the waves for increasing the production of the energy or toward dissonance with the waves to increase damping and restraint of the motion.

The hold 26 is adapted to accommodate a stabilizer frame means 28 comprising a co-axial, semicircular cylindrical bottom 29 and side walls 30 and rotatably and resistance-free affixed on the hull 21 by a plurality of co-axial, in relation to the axis, balls or rolls or wheels 31 guided by a retainer member 32 and rolling on the bottoms 22 and 29 or rails so that the frame 28 is isolated from a rocking, especially rolling motion of the hull 21. Any other well-know supporting means for the frame 28 may be used such as a fluid-cushion support.

The bottom 29 and the side walls 30 form a room for mounting a shaft 33 supported movingly and co-axially from the walls 24 therebetween, where two co-axial shafts could of course be utilized instead of the shaft 33 and more than one holds 26 may be arranged in the hull 21 depending on the design of the ship E; a fluid pump-motor means 34 connected with a pressure conduit and through a controllable check valve which open only under an intended pressure to a pressure tank 35 for containing a compressed fluid such as air or air and water and accumulating the potential energy and with a pressure conduit and through a well-known controllable pressure-relief valve (not shown) which open only under an intended pressure to a fluid turbine 36 connected with its shaft 37 via a well-known speed increaser such as gear box 38 and a shaft 39 to an electricity generator 40.

Many well-known means 34 for transforming kinetic energy of the rocking hull 21 into any usable energy such as potential energy of compressed air and electricity can be used on the vessel E. For example, an air- or water-compressing, potential energy generator and rocking motion-damping and constraint vane pump 34 comprises the shaft 33 provided with an elongate, radially disposed paddle piston 41, a co-axially disposed cylinder 42 secured at its ends to the walls 30 therein and provided with an radially disposed, elongate paddle piston 43; resilient packings 44 and 45 provided on the outer edges of the pistons 41 and 43 and engaged correspondingly on an outer surface of the shaft 33 and on an inner surface of the cylinder 42 for sealing the small gaps between the piston 43 and the shaft 33 and the cylinder 42 and between the piston 41 and the cylinder 42; an input pipe and a well-known, one-way check valve (not shown) that is closed to pressured fluid from the cylinder 42 but is open by suction produced by return strokes of the piston 43 that connect the operative compression side of the pump 34 to atmosphere and the water basin A.

The piston 43 is capable of being forced by the rocking hull 21 via the shaft 33 into interaction with the fluid which being in the cylinder 42 between the pistons 41 and 43 to compress the fluid and urge the fluid at the intended pressure through the pressure conduit and the tuned check valve which open only under the intended pressure to supply the pressured fluid into the tank 35. The pressured tank 35 can supply the pressured fluid with the output pressure conduit and through the tuned pressure-relief valve to the turbine 36 that drives via its power shaft 37, the speed increaser 38 and the shaft 39 of the generator 40.

The ship E is provided with at least two opposite disposed stopper means 46 comprising elongate tethers such as lengths of anchor chains, each of the chains having an upper chain end which being attached to the wall 23 closely to the axis and a lower chain end which being attached to an anchor capable of engaging to the water basin bottom or an motionless object such as a sea platform (not shown).

For the purpose of description of the operation of the ship E, it will be assumed, that the vessel E is placed on the waving surface of the rough water basin A to begin the operation and is maintained by the tethers 46 in an operative position along the waves. The hull 21 is then being rolled by the waves about the axis alternately in leftward and rightward lateral directions shown by the arrows C and D in FIG. 4.

In operation, the injection and drainage ballast pump of the bilge pumping equipment injects basin water A into the ballast sand which being in the holds 25 to increase the mass of the vessel E or removes the ballast water to decrease the mass of the vessel E and to displace the gravity center of the vessel E in relation to the axis from its position into an intended position which services to increase the kinetic energy of the rocking motion and the transformed power up to maximal permissible quantity or to decrease and restraint the unwanted rolling motion.

Whereby the hull 21 driven piston 41 rotates about the axis while the motionless frame 28 supported piston 43 being motionless in relation to the axis, thereby the piston 41 will move about the axis in relation to the piston 43 and a fresh fluid such as air or water of the basin A will be alternately sucked into and compressed in the cylinder 42 and the compressed fluid will be displaced from the cylinder 42 with the inlet pressure conduit and through the check valve into the tank 35 where its potential energy will be accumulated. Then the compressed fluid can be fed from the tank 35 with the outlet pressure conduit and the pressure-relief valve into the turbine 36 to rotate the turbine shaft 37, the rotation will be increased by the speed increaser 38 to rotate the shaft 39 of the generator 40 and electricity energy will generate.

These kinds of useable energy may be generated with using new and old ships, vessels, boats, pontoons etc. This method is distinguished from the well-known methods, based on the utilization of wave motion for a ship propulsion with a foil-type wave propulsion system, and providing conversion of an energy of hull's rocking, pitching and heaving, or rolling motion into movement of energy-generating part of an useable energy generator. The following categories of issues can use the rocking-driven energy generator technology: powering supply of sea oil platform, oceanographic researches, disaster coastal areas, desalinization plants, watering of coastal areas, etc. The stabilizer frame 28 is capable of being used as a rocking-free platform for comfortable lodging.

The above-mentioned embodiments of the invention can be versatile, cheap to manufacture, low in maintenance requirements, highly reliable and requiring a low degree of skill for installation, servicing and operation.

We claim as our invention:

1. A surface vessel adapted to receive and transfer kinetic energy of water waves, the vessel comprising:
    a hull supporting components of the vessel and adapted to be floated and moved with rocking, pitching and rolling about a determined centre point by the waves of a water basin;
    a frame means adapted to be stabilised with its support in relation to the basin;
    a means supporting the frame means on the hull for alternating lateral oscillation about the centre in order to the frame means being isolated from the motions as the vessel is floated;
    a means for controlling the oscillation of the hull in relation to the frame means.

2. The apparatus according to claim 1, wherein the controlling means comprises the hull having boards and a bottom shaped into a circular outer surface about the centre to effect increasing amplitudes and speeds of the motions.

3. The apparatus according to claim 1, wherein the controlling means comprises:
    a number of hull facilities for containing a ballast sand of an intended mass and a ballast water of an intended volume, the ballast water being spread within an intended volume of the sand and capable of changing the ballast mass and a position of a centre of hull mass;
    an energised bilge pumping equipment for effecting the spreading of the ballast water to change the ballast mass and the position of the centre of mass, and
    a means for measuring frequencies of the motions of the ballasted hull and determining when to operate an activating means of the bilge pumping equipment to effect tuning of the hull into resonance of the motions to effect increasing of the induced generation of the kinetic energy and into a dissonance of the motions to effect increasing of the restraint of the motions.

4. The apparatus according to claim 1, wherein the controlling means comprises the frame means supported at the centre and adapted to extend down toward below a water line of the hull and having a vertically disposed surface portion with its centre of dynamic pressure upon adjacent water of the basin that being remote from the centre of the motions.

5. The apparatus according to claim 1, wherein the controlling means comprises the hull having an upward oriented circular, in relation to the centre, supporting surface portion, the frame means having a downward oriented, concentric supporting surface portion, and the supporting means being disposed between and capable of interacting with the supporting portions.

6. The apparatus according to claim 1, wherein the controlling means comprises:
    a number of first rocking motion-restraint and energy-transferring members, each of the first members is supported at its end from the frame means in a depending relationship and remote from the centre of the motions;
    a number of second rocking motion-restraint and energy-transferring members, each of the second members is supported at its end from the hull remote from the centre and capable of being forced into interaction with a corresponding first member, where the motions produce a relative movement between the supported ends of the interacting first member and second member, which movement causes a relative movement between the interacting first member and second member to produce an amplified oscillating motion of the second member to provide intended restraint of the motions and generation of the energy.

7. The apparatus according to claim 6, wherein each of the number of the first members is supported for turning about a first point, and each of the second number of the second members is supported for turning about a second point, the first point and the second point being remote from the centre of motions.

8. The apparatus according to claim 6, wherein the controlling means comprises a number of reversible machines, each of the machines is being connected to the first member and to the second member therebetween and capable of generating an intended usable energy and restraint the relative movement between the ends of the first and second members.

9. The apparatus according to claim 8, wherein the machine is shaped into a cylinder and sliding vane motor-pump assembly comprising:

a circular cylindrical shaft having first and second opposing end pin portions and at least one pumping and damping vane portion extending radially, in relation to an axis of the shaft, between the first and second pin portions, where each of the vane portions has a first end and a second end and an outer edge extending between the first and second edges toward immediately an inner face of a pumping and damping cylinder of the assembly;

the co-axially disposed pumping and damping cylinder having two opposing, radially extending end walls that being provided with axial openings generally surrounding the pin portions of the shaft and a circular cylindrical wall extending between the end walls and having vane portions extending between end walls radially inward and toward immediately an outer face of the shaft;

a sealing means at the openings and edges of the vane portions of the shaft and cylinder for engaging on the faces of the cylinder and shaft to relatively close off interiors between the vane portions of the cylinder and shaft and prevent the outflow of the fluid materials being compressed from the interiors being reduced in volume into the adjacent interiors being extended in volume;

a valves and pipes for sucking the fluid materials into the interior being extended and exhausting the compressed fluid materials from the interior being reduced toward a reserve tank receiving and storing the compressed fluid materials, where the valves are capable of tuning the generating-pumping system or shutting it down;

the tank provided with valves and pipes for transferring the compressed fluid materials toward an energy user, where the valves are capable of changing pressure of the stored fluid materials for tuning the generating-pumping system or shutting it down.

\* \* \* \* \*